SYNCHRONISING ARRANGEMENT PARTICULARLY FOR TELEVISION APPARATUS
Filed Jan. 13, 1954
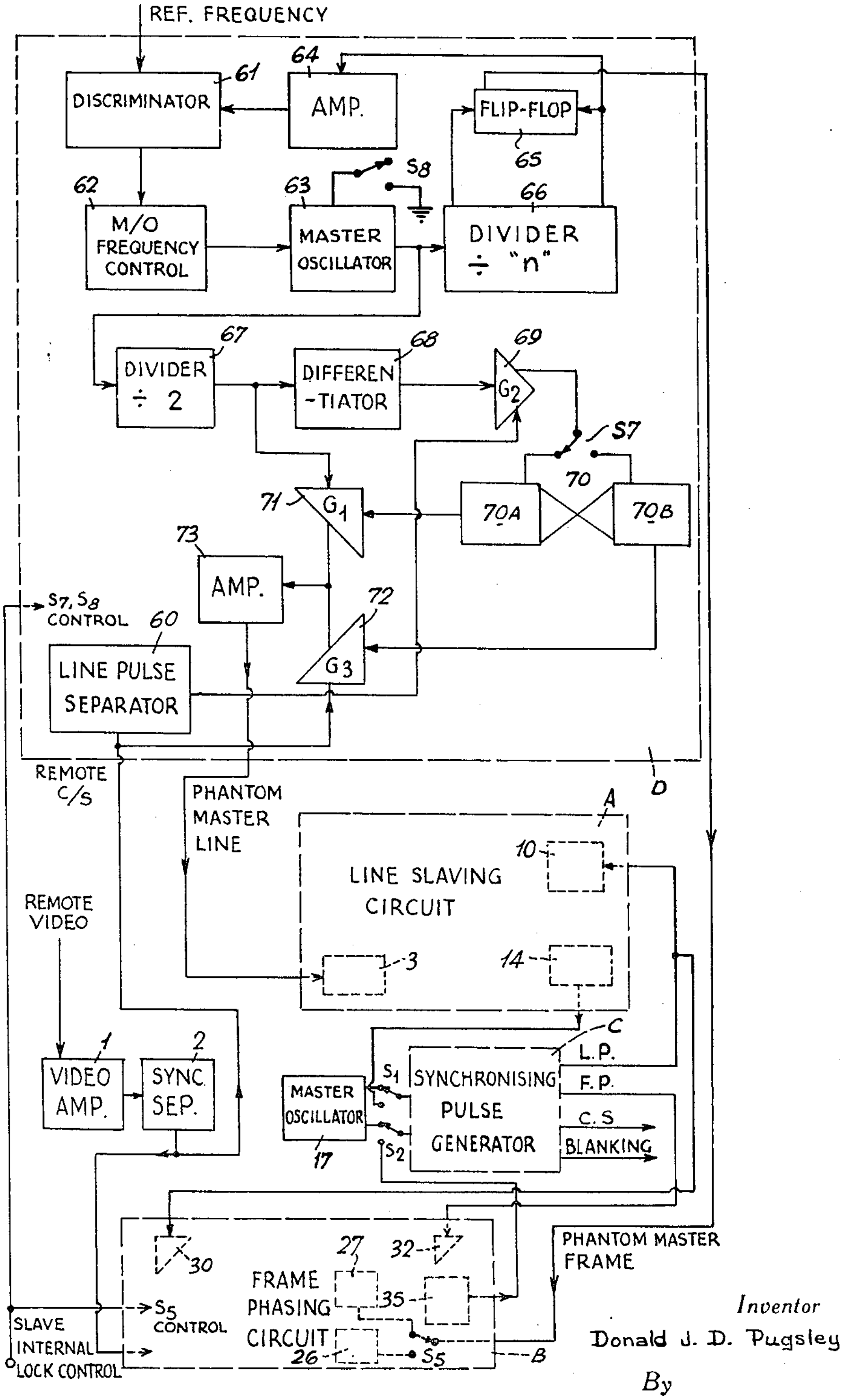
Inventor
Donald J. D. Pugsley
By
Holcombe, Wetherill & Brisebois Attorneys 2,752,423

SYNCHRONISING ARRANGEMENT, PARTICULARLY FOR TELEVISION APPARATUS

Donald John Davey Pugsley, Cambridge, England, assignor to Pye Limited, Cambridge, England, a British company Application January 13, 1954, Serial No. 403,846

Claims priority, application Great Britain January 28, 1953

17 Claims. (Cl. 178—69.5)

The present invention relates to a synchronising arrangement, particularly for television apparatus, for causing an oscillator or waveform generator to run in step with incoming synchronising pulses. The arrangement is particularly suitable for locking a television waveform to be radiated from a television transmitting station (hereinafter called the "local station") in step with the waveform received from a remote camera having its own waveform generator, for example a camera in a remote studio or used for an outside broadcast.

My co-pending application Serial No. 332,275 filed January 21, 1953 describes a line slaving circuit, and frame phasing circuits for phasing the line and frame synchronising signals at a television transmitting station with controlling line and frame waveforms originating, for example, from a remote camera having its own waveform generator.

However, with the arrangements described in the above mentioned application, the controlled master oscillator can only be used so long as the remote synchronising waveform is being received. If, during the course of a transmission, it is desired to shut down the remote equipment and continue the programme from the local studio only, or from a different remote studio, the effect of switching over to the local uncontrolled master oscillator, or of switching the line slaving and frame phasing circuits so that they will be controlled by the synchronising waveform from the different remote studio, produces undesirable disturbances in the received picture. Thus such switching operations should only be effected during a break in the video transmission.

To overcome this disadvantage, the present invention provides a circuit arrangement for selectively synchronising electronic apparatus, such as a waveform generator, from one of at least two trains of synchronising pulses, comprising an electronic switch which can be controlled to selectively pass any one of said trains of synchronising pulses to synchronise said electronic apparatus, and controlling means for said electronic switch whereby it can be changed over from passing one train of synchronising pulses to pass another train of synchronising pulses, said controlling means only becoming operative when said one and said another train of synchronising pulses are substantially coincident, or, are within a small predetermined time displacement from each other, whereby the change over from said one train of synchronising pulses to said another train of synchronising pulses is effected substantially without disturbing the synchronisation of said electronic apparatus.

From another aspect, according to the present invention, the local station is provided with an uncontrolled master oscillator (i. e. a master oscillator which is not controlled by the incoming controlling pulses although it may be controlled by a reference frequency, such as the mains frequency) and associated equipment for producing line and frame frequency pulses (hereinafter called a "phantom remote line and frame pulses") corresponding to the line and frame pulses received from the remote station, the line pulses of the remote waveform and phantom remote line pulses being selectively fed to the line slaving circuit through an electronic switch such that when a switch is operated to change from local to remote cameras, or vice versa, the electronic switch does not allow the selected controlling line pulses to be fed to the line slaving circuit until these line pulses are coincident with, or within a small predetermined time displacement from the line pulses of the controlling waveform which is being switched out, so that the changeover is made without disturbing the controlled master oscillator in the line slaving circuit, the operation of the switch also changing the feed to the frame phasing circuit so that the frame synchronising pulses generated in the synchronising pulses generator will be phased with the frame pulses of the selected controlling waveform. Normally the time before the line pulses of the two controlling waveforms become coincident is very short, but in order to ensure that this is so, according to another feature of the invention, when the changeover switch is operated, a circuit constant of the master oscillator producing the phantom remote line and frame frequency pulses is slightly changed to alter slightly the frequency of this oscillator within the limits of the system.

With this arrangement, it becomes possible to switch from the locally produced phantom remote line and frame frequency pulses to an incoming remote waveform, and vice versa, without producing apparent disturbances in the picture reproduced at the receiver, thus making it unnecessary to suppress the video signals during the changeover. The only disturbance is a slight change in the number of lines while frame phasing is taking place, but as this variation in number of lines occurs during the overscan period, no disturbance is noticeable in the picture reproduced in the receiver. The arrangement also enables the line slaving and frame phasing circuits to be controlled from the incoming remote waveforms from more than one remote station, for example by connecting the electronic switch circuit to the selected remote waveform whilst the line slaving and frame phasing circuits are being controlled by the phantom remote line and frame frequency pulses.

Although in its simplest form the electronic switch is arranged to switch between only two controlling waveforms, further switches being provided for selectively connecting the controlling waveforms to the electronic switch when pictures from two or more remote stations are to be transmitted in the same programme, in a modification the electronic switch may be arranged to switch between any applied remote waveform of any desired number of controlling remote waveforms.

In order to avoid the necessity of operating the line slaving and frame phasing circuits, and the master oscillator and associated equipment for producing the phantom remote line and frame frequency pulses, when only an entirely locally produced programme is to be transmitted, a second uncontrolled master oscillator may be provided at the local station which can be used for feeding the synchronising pulse generator at such times.

In order that the invention may be more fully understood, an embodiment thereof as applied to the British television standards will now be described with reference to the accompanying drawing, which is a block diagram of a circuit arrangement according to the invention comprising an electronic switch unit in conjunction with a line slaving circuit and a frame phasing circuit.

With the arrangements described in the aforementioned co-pending application, the switch over from the uncontrolled master oscillator at the local station, to the line slaving circuit and frame phasing circuit is carried out directly. This direct switching produces disturbances on the cathode-ray tube screens of receivers receiving the transmitted programme. This disturbance appears as a fluctuation of the area of the received picture. Thus it is desirable to suppress the video signal during switching.

This undesirable disturbance can be avoided and the synchronizing pulse generator at the local transmitter can be switched from internal lock to remote control or vice versa without the necessity of suppressing the video signal, by employing a circuit as illustrated in the accompanying drawing. In this embodiment the line slaving and frame phasing circuits are controlled selectively either by the remote controlling pulses or by locally generated phantom remote line and frame pulses, an electronic switch being provided for supervising the switching so that a change over can only take place when the line pulses of the two waveforms are substantially coincident, whereby the disturbance is avoided. In the illustrated embodiment the electronic switch circuit, including the phantom remote line and frame pulse generator, is shown enclosed within the dotted rectangle D. The line slaving circuit A, the frame phasing circuit B and the synchronising pulse generator C are as described with reference to Fig. 1 of the complete specification of the aforementioned co-pending application No. 332,275.

The phantom master oscillator 63 runs at twice line frequency and its frequency is controlled by means of the frequency control circuit 62 which may comprise a reactance valve. The twice line frequency pulses from the master oscillator 63 are fed to the divider 66 where they are divided by "*n*" which represents the number of lines in the television system. The output from the divider is fed to an amplifier 64 which produces the required output to operate the discriminator 61 to which a reference waveform, which may be the A. C. mains, is also fed. The phase of the reference waveform and the divider output are compared in the discriminator to produce a D. C. potential which is fed to the frequency control circuit 62 to control the phantom master oscillator 63 such that its frequency, when divided by the divider 66, will have the same frequency as the reference frequency waveform. A flip-flop circuit 65, also fed from divider 66, is arranged to produce pulses of a frequency equal to the divider output frequency, that is of frame frequency, and of a duration equal to the frame synchronising periods of the television system. This waveform is fed to the frame phasing circuit via the switch S5, located between the divider 26 and the differentiator 27 where, when the frame phasing circuit is switched to internal lock, it will act as an internally generated frame synchronising pulse, herein called a phantom remote frame pulse, to phase the frame pulses from the synchronising pulse generator C with the phantom remote frame pulses and therefore to the reference waveform.

An output from the master oscillator 63 is also fed to the divide-by-2 circuit 67, the output of which is a 50/50 square wave running at the line frequency and is required for internal lock operation. An output is fed from the divider circuit 67 to the gate circuits 71 which will either gate the applied input pulses through to amplifier 73 or else cut them off.

Gate 72 is supplied with the remote complete synchronising signal via the video amplifier 1, and synchronising pulse separator 2, and is so arranged that when gate 71 is conducting gate 72 is nonconducting and vice versa, these two gates having a common output circuit to the amplifier 73 feeding the differentiator or blocking oscillator 3 in the line slaving circuit A. Thus, the input to the line slaving circuit from the amplifier 73 is either the remote complete synchronising signal fed through gate 72, or an internally generated line frequency pulse fed through gate 71, and herein called phantom remote line pulses.

The switch-over to the remote controlling waveform from the phantom remote line and frame pulses and vice versa is accomplished in the following manner. The remote complete synchronising signal is fed, via the video amplifier 1, and synchronising separator 2, to a line pulse separator circuit 60, which may comprise a blocking oscillator and differentiator, the output of which is a series of short duration pulses at line frequency. This output from the circuit 60 is fed to the coincidence gate circuit 69, the pulses being at line frequency and of a duration of approximately one half microsecond beginning with the leading edge of the remote line synchronising pulses. The gate 69 is also fed with the phantom remote line frequency pulses from the divider 67 through the differentiator circuit 68. These differentiated pulses also have a duration of approximately one half microsecond. Gate 69 is arranged to conduct when the two sets of pulses are coincident.

Switch S7, which may be a relay, switches the output from gate 69 to either of the two inputs of flip-flop 70 comprising two valves 70*a* and 70*b*, and which has two stable states. The first of these stable states is with valve 70*a* conducting and valve 70*b* non-conducting, the other stable state being valve 70*a* non-conducting and 70*b* conducting. The outputs from 70*a* and 70*b* are D. C. connected to gates 71 and 72 respectively so that if the circuit is operating with switch S7 as shown in the drawing, connecting flip-flop 70*a* with gate 69, this flip-flop will be in its stable non-conducting state and its output will be positive. This positive output is applied to gate 71 and therefore allows this gate to conduct and pass phantom line pulses through amplifier 73 to feed the line slaving circuit. At the same time valve 70*b* will be conducting and its output will be negative, thus cutting off gate 72, and therefore the remote synchronising pulses will not be fed to the line slaving circuit.

When switch S7 is thrown to the reverse position, which is the remote slaving position, no change of state of flip-flops 70*a* and 70*b* will take place until a switching pulse is applied from gate 69, and this can only occur when the remote line synchronizing pulses are coincident with the phantom line pulses to within one-half microsecond, when gate 69 will conduct and supply a pulse to make valve 70*a* conducting and 70*b* non-conducting, and thus switch over the gates 71 and 72, so that gate 71 is non-conducting and gate 72 is conducting. The remote complete synchronising pulses will now be fed to the line slaving circuit A. It will thus be seen that the maximum difference in phase between the remote line pulses and the phantom line pulses at the instant at which the electronic switch operates is equal to the width of the two trains of differentiated line pulses which, in the present example, is of the order of one half microsecond.

In order to ensure that the two trains of differentiated pulses will become coincident within a reasonable period after the operation of the switch S7, the operation of this latter switch in either direction opens or closes the switch S8 which connects a small condenser to the phantom master oscillator 63 to alter one of its circuit constants and cause its frequency to drift slightly.

When the switch S7 is operated the switch S5 in the frame phasing circuit B, which changes the input from phantom remote frame pulses to remote frame pulses, is also operated.

It will thus be seen that the act of changing from local control to remote control can be effected with no apparent disturbance to the picture reproduced on the screen of a receiver.

The arrangement shown also enables the remote station to shut down during programmes produced at the local station.

The circuit also includes an uncontrolled master oscillator 17 which can be used when only local cameras are to be used during a complete programme.

When the frame phasing circuit comprises the arrangement shown in Fig. 8 of the complete specification of aforementioned co-pending application No. 332,275 a switch is provided to take the place of switch S5, and switch the output of flip-flop 65 to the gate 53 of Fig. 8 of the aforementioned complete specification.

Whilst a particular embodiment has been described, it will be understood that various modifications may be made without departing from the scope of the invention. For example, if when operating on local control no particular phase relationship between the frame synchronising pulses and the reference frequency is required, the flip-flop 65 may be omitted. In this case, switch S5 in the frame phasing circuit can be used to switch correction pulses to the synchronising pulse generator C from the output of the frame phasing circuit when slaved to a remote station.

I claim:

1. Television transmitting apparatus for selectively synchronising a synchronising pulse generator at a local station from synchronising pulses produced at said local station and synchronising pulses produced at a remote station, comprising an electronic switch, means for feeding said synchronising pulses produced at the local station to the electronic switch, means for feeding said synchronising pulses from the remote station to the electronic switch, a selector switch for selecting the controlling synchronising pulses, means controlling the electronic switch in response to operation of the selector switch, and means for rendering said controlling means operative upon the substantial coincidence of the local synchronising pulses with the remote synchronising pulses to operate the electronic switch in accordance with the predetermined selection of said selector switch to feed the selected controlling synchronising pulses to said synchronising pulse generator at said local station.

2. Apparatus as claimed in claim 1 comprising means for selectively connecting at least one further train of synchronising pulses from a remote station to the electronic switch.

3. Television transmitting apparatus for selectively synchronising a synchronising pulse generator at a local station from synchronising pulses produced at said local station and synchronising pulses produced at a remote station, comprising an electronic switch, means for feeding line frequency synchronising pulses produced at the local station to the electronic switch, means for feeding line frequency pulses from the remote station to the electronic switch, a selector switch for selecting the controlling synchronising pulses, means controlling the electronic switch in response to operation of the selector switch, and means for rendering said controlling means operative upon the substantial coincidence of the local line frequency pulses with the remote line frequency pulses to operate the electronic switch to feed the controlling line frequency pulses selected by the selector switch to the synchronising pulse generator, and means for changing the feed of the frame frequency synchronising pulses produced locally and the remote frame frequency synchronising pulses simultaneously with the change of the controlling line pulses.

4. Television apparatus for selectively synchronising a waveform generator at a local station with synchronising pulses generated locally and synchronising pulses received from a remote station comprising means for generating synchronising pulses at the local station, a first gate circuit, means for feeding the local synchronising pulses to the first gate circuit, a second gate circuit, means for feeding the synchronising pulses received from the remote station to the second gate circuit, a trigger circuit controlling said first and second gate circuits, to cause either the local synchronising pulses or the remote synchronising pulses to be fed to synchronise the local, waveform generator, a selector switch for selecting the controlling synchronising pulses and means for operating said trigger circuit upon actuation of the selector switch and in response to a predetermined degree of coincidence of the local and remote synchronising pulses to feed the selected controlling synchronising pulses to the waveform generator.

5. Television apparatus for selectively synchronising a waveform generator at a local station with synchronising pulses generated locally and synchronising pulses received from a remote station comprising means for generating line frequency pulses at the local station, a first gate circuit, means for feeding the local line frequency pulses to the first gate circuit, a second gate circuit, means for feeding the line frequency pulses received from the remote station to the second gate circuit, a trigger circuit controlling said first and second gate circuits to cause either the local line frequency pulses or the remote line frequency pulses to be fed to synchronise the local waveform generator, a selector switch for selecting the controlling synchronising pulses, and means for operating said trigger circuit upon actuation of the selector switch and in response to a predetermined degree of coincidence of the local and remote line frequency pulses to feed the selected controlling synchronising pulses to said waveform generator.

6. Television transmitting apparatus, comprising means for producing a television waveform comprising line and frame synchronising pulses at a remote station, a master oscillator at a local station, means for producing line and frame pulses from said master oscillator at said local station, a first gate circuit, means for feeding the locally produced line pulses to the first gate circuit, a second gate circuit, means for feeding the remote line pulses to the second gate circuit, a trigger circuit having two stable states, means connecting outputs from the trigger circuit to the first and second gate circuits, means for controlling the trigger circuit to a selected stable state upon the substantial coincidence of the local line pulses with the remote line pulses, means for feeding the output of the trigger circuit to control the conductance of said first and second gate circuits according to the selected stable state of said trigger circuit, a waveform generator at said local station and means for feeding the selected output from one of said first and second gate circuits to synchronise said waveform generator.

7. Apparatus as claimed in claim 6 comprising a second master oscillator at the local station and means for connecting said second master oscillator to the local waveform generator when an entirely locally produced waveform is required.

8. Apparatus as claimed in claim 6 comprising means for locking the master oscillator at the local station to a reference frequency.

9. Television transmitting apparatus, comprising means for producing a television waveform comprising line and frame synchronising pulses at a remote station, a master oscillator at a local station, means for producing line and frame pulses from said master oscillator at said local station, a first gate circuit, means for feeding the locally produced line pulses to the first gate circuit, a second gate circuit means for feeding the remote line pulses to the second gate circuit, means for producing short duration pulses from said local line pulses, means for producing short duration pulses from said remote line pulses, a trigger circuit having two stable states, means connecting two outputs from the trigger circuit respectively to the first and second gate circuits, means controlling the trigger circuit to a selected stable state in dependence upon the degree of coincidence of said short duration pulses, means for feeding the output of the trigger circuit to control the conductance of said first and second gate circuits according to the selected stable state of said trigger circuit, a waveform generator at said local station means for feeding the selected output from one of said first and second gate circuits to synchronise said waveform generator, and means for selectively feeding the local or remote frame pulses to said local waveform generator.

10. Television transmitting apparatus, comprising means for producing a television waveform comprising line and frame synchronising pulses at a remote station, a master oscillator at a local station means for producing line and frame pulses from said master oscillator at said local station, a first gate circuit, means for feeding the locally produced line pulses to the first gate circuit, a second gate circuit, means for feeding the remote line pulses to the second gate circuit, means for producing short duration pulses from said local line pulses, means for producing short duration pulses from said remote line pulses, a coincidence gate, means for feeding said remote and local short duration pulses to said coincidence gate, a trigger circuit having two stable states, two input terminals and two output terminals, a selector switch connecting the output of the coincidence gate to either one of the two input terminals of the trigger circuit means connecting the two outputs from the trigger circuit respectively to the first and second gate circuits, means for controlling the conductance of said first and second gate circuits in dependence upon the stable state of said trigger circuit, means for changing the stable state of said trigger circuit by an output from the coincidence gate upon substantial coincidence of the short duration pulses applied to said coincidence gate, a waveform generator at said local station and means for feeding the pulse output from said first and second gate circuits to said waveform generator.

11. Apparatus as claimed in claim 10 comprising means for changing a circuit constant of said master oscillator when the selector switch is actuated.

12. Apparatus as claimed in claim 10 comprising means for locking the master oscillator at the local station to a reference frequency.

13. Television transmitting apparatus, comprising means for producing a television waveform comprising line and frame synchronising pulses at a remote station, a master oscillator at a local station, means for producing line and frame pulses from said master oscillator at said local station, a first gate circuit, means for feeding the locally produced line pulses to the first gate circuit, a second gate circuit, means for feeding the remote line pulses to the second gate circuit, means for producing short duration pulses from said local line pulses, means for producing short duration pulses from said remote line pulses, a coincidence gate, means for feeding said remote and local short duration pulses to said coincidence gate, a trigger circuit having two stable states, two input terminals and two output terminals, a selector switch connecting the output of the coincidence gate to either one of the two input terminals of the trigger circuit means connecting the two ouput terminals from the trigger circuit respectively to the first and second gate circuits, means for controlling the conductance of said first and second gate circuits in dependence upon the stable state of said trigger circuit, means for changing the stable state of said trigger circuit by an output from the coincidence gate upon substantial coincidence of the short duration pulses applied to said coincidence gate, a waveform generator, at said local station means for feeding the selected pulse output from said first and second gate circuits to said waveform generator, means for selectively feeding the local or remote frame pulses to said waveform generator through a second selector switch and means for controlling the operation of said second selector switch simultaneously with the operation of said first selector switch.

14. Apparatus as claimed in claim 13 comprising a second master oscillator at the local station and means for connecting said second master oscillator to the local waveform generator when an entirely locally produced waveform is required.

15. Apparatus as claimed in claim 13 comprising means for locking the master oscillator at the local station to a reference frequency.

16. A circuit arrangement for selectively synchronising electronic apparatus, such as a waveform generator, from one of at least two trains of synchronising pulses, comprising an electronic switch which can be controlled to selectively pass any one of said trains of synchronising pulses to synchronise said electronic apparatus, means for selecting the train of synchronising pulses which is to synchronise said electronic apparatus controlling means for said electronic switch actuated in response to operation of the selecting means for changing said switch from passing one train of synchronising pulses to pass another train of synchronising pulses, and means for only actuating said controlling means after operation of the selecting means when said one and said another train of synchronising pulses are within a small predetermined time displacement from each other, whereby the change over by said electronic switch from said one train of synchronising pulses to said another train of synchronising pulses is effected substantially without disturbing the synchronisation of said electronic apparatus.

17. A circuit arrangement for selectively synchronising electronic apparatus, such as a waveform generator, from either one of two trains of synchronising pulses, comprising an electronic switch, means for feeding said two trains of synchronising pulses to said electronic switch, a selector switch for selecting the controlling synchronising pulses, means operating said electronic switch to pass the selected synchronising pulses, means for actuating the operating means in accordance with the selection of said selector switch, and when the two trains of synchronising pulses are substantially coincident and means for feeding the output from said electronic switch to synchronise said electronic apparatus.

References Cited in the file of this patent

UNITED STATES PATENTS

| | | |
|---|---|---|
| 2,278,788 | Knick | Apr. 7, 1942 |
| 2,414,453 | France | Jan. 21, 1947 |
| 2,570,775 | De Baun | Oct. 9, 1951 |